Patented Dec. 1, 1931

1,834,314

UNITED STATES PATENT OFFICE

JEAN GEORGES KERN AND CHARLES I. SALA, OF WILMINGTON, DELAWARE, ASSIGNORS TO E. I. DU PONT DE NEMOURS & COMPANY, OF WILMINGTON, DELAWARE, A CORPORATION OF DELAWARE

PRINTING PASTE AND PROCESS OF PRODUCING THE SAME

No Drawing.   Application filed May 31, 1927.   Serial No. 195,579.

This invention relates to new salts of sulfonated unsaturated aliphatic acids and mixtures thereof. More particularly, it relates to ricinoleic acids, such as sulfo-ricinoleic acids, and organic bases, to be used as solvents and emulsifying agents in printing pastes.

Only the sodium and ammonium salts of sulfo-ricinoleic acid have been used in the dyeing art and in the preparation of textile materials.

The object of this invention is the production of compounds suitable for dissolving or suspending the lakes of basic colors and converting them into easily emulsified solutions which will effect dyeing. A further object of my invention is to provide a printing paste that can be satisfactorily applied to cotton, woolen, silk, and linen fabrics, and in fact, to all fibres whether of vegetable or animal origin by a process which does not involve a steaming operation or a preliminary mordanting of the goods to be dyed or printed.

It has been found that free sulfo-ricinoleic acid partly combines or mixes with organic bases to give products which are extraordinary good solvents. Various organic bases may be used, such as aniline, mono- or dihydroxy ethylaniline or mixtures of these, dimethyl-aniline, pyridine, etc.

A mixture of sulfo-ricinoleic acids is produced by the action of sulphuric acid on castor oil. The watery layer is separated therefrom and the product washed to free it from mineral acid. The wet oil is then dried, either by settling or by mechanical means such as by centrifuging. This crude free sulfo-ricinoleic acid is mixed then with sufficient organic bases to remove the acidity.

The following examples are given for the purpose of illustrating the manner in which these new products may be produced and include the preferred ingredients which are thoroughly mixed to a thick oil:

Example I 4 parts of the sulfonation product of castor oil are mixed with
1 part of aniline oil by stirring The product produced in this way is a yellow oil.

Example II 2.8 parts of the crude sulfonated oil mixture of free acids are mixed with
1 part of mono-hydroxy-ethyl aniline

Example III 2.1 parts of the crude sulfonated oil mixture of free acids are mixed with
1 part of di-hydroxy-ethyl aniline.

It is obvious, of course, that other organic bases may be substituted for those preferred, without altering the character of the product.

The composition described is very useful, and permits printing in a true solution of lakes, especially those of basic colors. This method has a particular use in discharge printing with basic colors.

The amount of solvent can be varied within certain limits, but any large excess will decrease the fastness to rubbing of the prints and will also cause spreading of the color. Among the principal improvements in the use of this method is the superior brilliancy and the very good fixation of the dyestuff lake that is obtained. The preferred method of application is represented in the following example:

Example IV 10 parts basic color (suitable for discharge printing)
50 parts glycerine
50 parts solvent as described above
250 parts water
580 parts thickening composed of starch or gums and a certain amount of sodium hydrosulfite-formaldehyde necessary to cut the ground
60 parts tannin dissolved in equal parts of water or alcohol
———
1000

The textile or other material printed with this composition is aged and heated, passed into antimony salts, washed, and finished as usual.

The new products are remarkable solvents for basic dyestuff lakes and they may be used in printing pastes, especially in discharge printing paste in conjunction with other solvents such as phenol, resorcine, glycerine, glycol, glycol monochlorhydrin, etc., yielding remarkably fast shades.

The following example illustrates one method of our invention:

*Example V*

```
  50 parts of basic color tannate are pasted with
  50 parts glycerine and
  25 parts hot water. Add to this paste
100-200 parts of solvent as described above and heat until
        solution is complete. After cooling add:
775-675 parts of thickening composed, according to the re-
        quirements of the case, of gum, dextrine,
        starches, water, and such amounts of hydro-
        sulfite-formaldehyde as is necessary for dis-
        charging the ground.
─────
 1000
```

As a rule and in order to obtain the maximum of fastness the amount of solvent described above should not exceed 10 per cent of the total printing paste.

A preferred form of the use of these solvents is the following:

*Example VI*

```
 50 parts color tannate  ⎫
 75 parts glycerine      ⎬ are brought to solution
125 parts phenol         ⎪    and mixed with:
 50 parts solvent        ⎭
700 parts thickening as described above.
────
1000
```

The printed fabric is then aged from 4 to 5 minutes, passed into an antimony bath, rinsed, soaped, dried and finished.

A further use of these solvents is their application in dyeing operations on silk with basic color tannates or their like, for instance, a basic tannate lake may be solubilized as described above.

*Example VII*

```
 20 parts tannate
 50 parts glycerine
100 parts of above solvent, and brought up to
1000 with water slightly thickened with gum tragacanth,
     for example.
```

An emulsion is obtained which contains the tannate apparently in solution in the emulsified droplets. The silk may be entered lukewarm and then dyed progressively, raising the temperature to 80–90° C. and exhausting with sodium sulfate. Faster shades are obtained in this way.

As many apparently widely different embodiments of this invention may be made without departing from the spirit thereof, it is to be understood that we do not limit ourselves to the foregoing examples or descriptions except as indicated in the following patent claims.

We claim:

1. A solvent and emulsifying agent for printing paste which comprises sulfo-ricinoleic acid in admixture with hydroxy-ethyl aniline.

2. A solvent and emulsifying agent for printing paste which comprises sulfo-ricinoleic acid in admixture with an organic base taken from a group consisting of aniline, mono- or dihydroxy-ethylaniline, or mixtures of these and dimethyl-aniline.

3. A printing paste which comprises the sulfonation product of castor oil and an aniline compound taken from a group consisting of aniline, mono- or dihydroxy-ethylaniline, or mixtures of these, and di-methyl-aniline in combination with a basic color.

4. A printing paste which comprises the sulfonation product of castor oil and an hydroxy-ethyl aniline compound in combination with a basic color including a tannate.

5. A printing paste which comprises the sulfonation product of castor oil and an hydroxy-ethyl aniline compound in combination with a basic color lake of a hydroxy-aromatic-carboxylic acid.

6. The method of printing fabrics which consists in applying thereto sulfo-ricinoleic acid in admixture with hydroxy-ethyl aniline and a lake.

7. A printed fabric, the prints thereon comprising the sulfonation product of castor oil and an hydroxy-ethyl aniline compound in combination with a basic color lake of a hydroxy-aromatic-carboxylic acid.

8. A printing paste which comprises a mixture of a thickener and a mixture of sulfo-ricinoleic acid and an hydroxyl substituted aniline compound.

9. A solvent and emulsifying agent for printing paste which comprises sulfo-ricinoleic acid in admixture with an hydroxy-ethyl aniline compound.

10. A solvent and emulsifying agent for printing paste which comprises sulfo-ricinoleic acid in admixture with mono- and di-hydroxy ethyl aniline compounds.

11. A solvent and emulsifying agent for printing paste which comprises sulfo-ricinoleic acid in admixture with an organic base taken from a group consisting of aniline, mono- or di-hydroxy ethyl aniline or mixtures of these and dimethyl aniline.

12. The method of textile printing which consists in applying to textiles a composition which comprises an admixture of sulfo-ricinoleic acid and an hydroxyl substituted aniline compound.

13. The method of textile printing which consists in applying to the textile a composition which comprises an admixture of sulfo-ricinoleic acid with mono- and di-hydroxy ethyl aniline compounds.

In testimony whereof we affix our signatures.

JEAN GEORGES KERN.
CHARLES I. SALA.